(12) United States Patent
Ehteshami et al.

(10) Patent No.: US 10,843,117 B2
(45) Date of Patent: Nov. 24, 2020

(54) ACTIVE CARBON FILTER FOR A CARBON CANISTER AND A METHOD FOR PRODUCING THE SAME

(71) Applicant: Ford Motor Company, Dearborn, MI (US)

(72) Inventors: Seyyed Mohsen Mousavi Ehteshami, San Diego, CA (US); Mohammad Usman, Northville, MI (US); Sami Siddiqui, Canton, MI (US); Zhuoyuan Li, Dearborn, MI (US); Syed K Ali, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 242 days.

(21) Appl. No.: 15/989,849

(22) Filed: May 25, 2018

(65) Prior Publication Data

US 2019/0358576 A1 Nov. 28, 2019

(51) Int. Cl.
*B01D 53/04* (2006.01)
*F02M 25/08* (2006.01)
*B01J 20/20* (2006.01)
*B01J 20/26* (2006.01)
*B01J 20/28* (2006.01)
(Continued)

(52) U.S. Cl.
CPC .......... *B01D 53/0407* (2013.01); *B01J 20/20* (2013.01); *B01J 20/26* (2013.01); *B01J 20/28045* (2013.01); *B01J 20/3007* (2013.01); *B01J 20/3078* (2013.01); *B01J 20/324* (2013.01); *B01J 20/3208* (2013.01); *F02M 25/0854* (2013.01); *B01D 2253/102* (2013.01); *B01D 2253/25* (2013.01); *B01D 2253/3425* (2013.01)

(58) Field of Classification Search
CPC ............... B01D 53/04; B01D 53/0407; B01D 2253/102; B01D 2253/25; B01D 2253/3425; B01D 2257/708; B01D 2259/4516; B01J 20/20; B01J 20/26; B01J 20/28045; B01J 20/3007; B01J 20/3208; B01J 20/324; F02M 25/0854
USPC ............... 95/146; 96/154; 123/519; 428/116
See application file for complete search history.

(56) References Cited

U.S. PATENT DOCUMENTS

| 4,386,947 A * | 6/1983 | Mizuno | .................. B01D 53/02 123/519 |
| 5,435,958 A * | 7/1995 | Dinnage | .............. B01D 53/261 156/210 |
| 6,375,699 B1 | 4/2002 | Beck | |

(Continued)

FOREIGN PATENT DOCUMENTS

| JP | H08188489 | 7/1996 |
| WO | 2007/063608 | 6/2007 |

OTHER PUBLICATIONS

Surface Coating of Plastic Parts for Business Machines, U.S. Environmental Protection Agency, 1986.

(Continued)

*Primary Examiner* — Frank M Lawrence, Jr.
(74) *Attorney, Agent, or Firm* — Burris Law, PLLC (57) ABSTRACT

A method for producing an active carbon filter for a carbon canister includes defining a body having a honeycomb structure with a plurality of bleed passages from a polymer based material, and forming an adsorption layer along a surface of the body, where the adsorption layer is made of a carbon based material.

13 Claims, 6 Drawing Sheets

(51) Int. Cl.
*B01J 20/30* (2006.01)
*B01J 20/32* (2006.01)

(56) References Cited

U.S. PATENT DOCUMENTS

| | | | |
|---|---|---|---|
| 6,390,073 B1 | 5/2002 | Meiller et al. | |
| 6,695,896 B2* | 2/2004 | Hara | B01D 53/0446 |
| | | | 123/519 |
| 6,896,852 B1* | 5/2005 | Meiller | B01D 53/0415 |
| | | | 123/519 |
| 7,704,296 B2 | 4/2010 | Merkel | |
| 7,722,705 B2 | 5/2010 | Gadkaree et al. | |
| 7,803,447 B2 | 9/2010 | Kondo et al. | |
| 7,909,919 B2* | 3/2011 | Kosugi | B01D 53/0407 |
| | | | 123/519 |
| 8,361,205 B2 | 1/2013 | Desai et al. | |
| 9,358,496 B2 | 6/2016 | Berges et al. | |
| 9,657,693 B2 | 5/2017 | Berisha et al. | |
| 2003/0101871 A1 | 6/2003 | Scardino | B01D 53/0415 |
| | | | 95/279 |
| 2005/0092176 A1* | 5/2005 | Ding | B01D 53/02 |
| | | | 95/90 |
| 2007/0113831 A1* | 5/2007 | Hoke | F02M 25/089 |
| | | | 123/519 |
| 2008/0242535 A1 | 10/2008 | Liu et al. | |
| 2008/0251053 A1 | 10/2008 | Shears et al. | |
| 2010/0065030 A1* | 3/2010 | Bellis | B01D 53/0415 |
| | | | 123/574 |
| 2010/0316538 A1* | 12/2010 | Buelow | B01J 20/103 |
| | | | 422/177 |
| 2013/0276634 A1* | 10/2013 | McKenna | B01J 20/28026 |
| | | | 96/153 |
| 2013/0291734 A1 | 11/2013 | Lin et al. | |
| 2016/0076179 A1* | 3/2016 | Witte | B32B 5/02 |
| | | | 428/116 |
| 2017/0304766 A1* | 10/2017 | Park | B01D 53/0415 |

OTHER PUBLICATIONS

Andrew Ng MH, Hartadi LT, Tan H, Patrick Poa CH, "Efficient coating of transparent and conductive carbon nanotube thin films on plastic substrates." Nanotechnology, 19 (2008) 205703.

Cunman Zhang, Zhen Geng, Jianxin MA, "Self-assembly synthesis of ordered mesoporous carbon thin film by a clip-coating technique." Microporous and Mesoporous Materials 170 (2013) 287-292.

Alessandra Mosca, Jonas Hedlund, Paul A.Webley, Mattias Grahn, Fateme Rezaei, "Structured zeolite NaX coatings on ceramic cordierite monolith supports for PSA applications." Microporous and Mesoporous Materialsvol. 130, Issues 1-3, May 2010, pp. 38-48.

M.A. Ulla, R. Mallada, J. Coronas, L. Gutierrez, E. Miro', J. Santamari'a, "Synthesis and characterization of ZSM-5 coatings onto cordierite honeycomb supports" Applied Catalysis A: General 253 (2003) 257-269.

Ling Huang, Zhonghua Xiang, and Dapeng Cao, "A porous diamond carbon framework: a new carbon allotrope with extremely high gas adsorption and mechanical properties." Journal of Materials Chemistry A 2013,1, 3851-3855.

* cited by examiner

ACTIVE CARBON FILTER FOR A CARBON CANISTER AND A METHOD FOR PRODUCING THE SAME

FIELD

The present disclosure relates to an active carbon filter for a carbon canister of a vehicular evaporative emission control system.

BACKGROUND

The statements in this section merely provide background information related to the present disclosure and may not constitute prior art.

Vehicles having internal combustion engines generally include an evaporative emission control (EEC) system to block or capture hydrocarbons from, for example, diurnal emissions, refueling emission, permeation, and/or other evaporative emissions. Diurnal emission is caused by the evaporation of gasoline within a gas tank due to changes in temperature throughout the day, the refueling emission occurs as gasoline is pumped in the tank, and permeation occurs when a polymer based component of the fuel system is saturated with fuel.

In addressing the various evaporative emissions, the EEC system includes a carbon canisters that includes active carbon elements, such as carbon pellets and filters, to draw in and store the hydrocarbons. The hydrocarbons are generally removed during engine operation by drawing in clean air in the carbon canister to release the hydrocarbons from the carbon element and move the hydrocarbons to the intake of the engine.

To satisfy increasingly strict global evaporative emission regulations, additional emphasis and development has been placed on the quality and adsorbent properties of the carbon elements. For instance, activated carbon honeycomb structures are used as bleed elements to supplement the adsorption capacity in addition to carbon pellets. But these carbon honeycomb structures can be fragile and costly. These and other issues regarding carbon elements for a carbon canister are addressed by the teachings of the present disclosure.

SUMMARY

This section provides a general summary of the disclosure, and is not a comprehensive disclosure of its full scope or all of its features.

In one form, the present disclosure is directed toward a method for producing an active carbon filter for a carbon canister. The method includes defining a body having a honeycomb structure with a plurality of bleed passages from a polymer based material, and forming an adsorption layer along a surface of the body, where the adsorption layer is made of a carbon based material.

In another form, the defining the body further includes forming a plurality of substrates, where each of the substrates defines a plurality of channels extending along a first axis, and stacking the plurality of substrates along a second axis perpendicular to the first axis to define the body having the honeycomb structure. The adsorption layer is formed along the surface of each of the substrates.

In yet another form, the adsorption layer is formed on each surface of the substrates before the substrates are stacked.

In one form, the method further includes housing the body defined by the substrates and having the adsorption layer in a case. The case has a polymer based core with a supplemental adsorption layer disposed along the surface of the core.

In another form, the substrates are formed using injection molding.

In yet another form, the forming the adsorption layer further includes, for each of the substrates, depositing the carbon based material along the surface of the substrate. The substrates are stacked after the adsorption layer is formed on the substrates.

In one form, the defining the body further includes injection molding the body as a single piece using the polymer based material.

In another form, the defining the body further includes injection molding the body using a first material made of the polymer based material and a second material made of the carbon based material, and the forming the adsorption layer further includes sintering the body made of the first and second materials to expose the carbon based material along the surface of the body.

In yet another form, the adsorption layer is formed using one of the following procedures: dip-coating, seeding and in situ growth, or plasma coating.

In one form, the thickness of the adsorption layer is between 10 μm to 100 μm.

In one form, the present disclosure is directed toward an active carbon filter that includes a body and an adsorption layer. The body defines a honeycomb structure with a plurality of bleed passages, and the body is defined by a polymer based material. The adsorption layer is disposed along a surface of the body, and the adsorption layer is defined by a carbon based material.

In another form, the body is defined by a plurality of substrates, each of the substrates defines a plurality of channels extending along a first axis, and the substrates are arranged in a stacked configuration along a second axis perpendicular to the first axis to defining the body having the honeycomb structure. The adsorption layer is disposed along the surface of each of the substrates.

In yet another form, the active carbon filter further includes a case housing the body, and the case has a core defined by the polymer based material and a supplemental adsorption layer defined by the carbon based material and disposed along a surface of the core.

In one form, the present disclosure is directed toward a carbon canister that includes one or more of the active carbon filters of the present disclosure.

In one form, the present disclosure is directed toward a method for producing an active carbon filter for a carbon canister. The method includes defining a body having a honeycomb structure with a plurality of bleed passages extending along a first axis, and forming an adsorption layer along an entire surface of the body. The body is formed from a polymer based material, and the adsorption layer is made of a carbon based material.

In another form, the defining the body further includes forming a plurality of substrates, where each of the substrates defines a plurality of channels extending along a first axis, and stacking the plurality of substrates along a second axis perpendicular to the first axis to define the body having the honeycomb structure.

In yet another form, the adsorption layer is formed on each surface of the substrates before the substrates are stacked.

In one form, the substrates are formed using injection molding.

In another form, the forming the adsorption layer further comprises, for each of the substrates, depositing the carbon based material along the surface of the substrate, where the substrates are stacked after the adsorption layer is formed on the substrates.

In yet another form, the defining the body further comprises injection molding the polymer based material to form the body as a monolithic piece.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
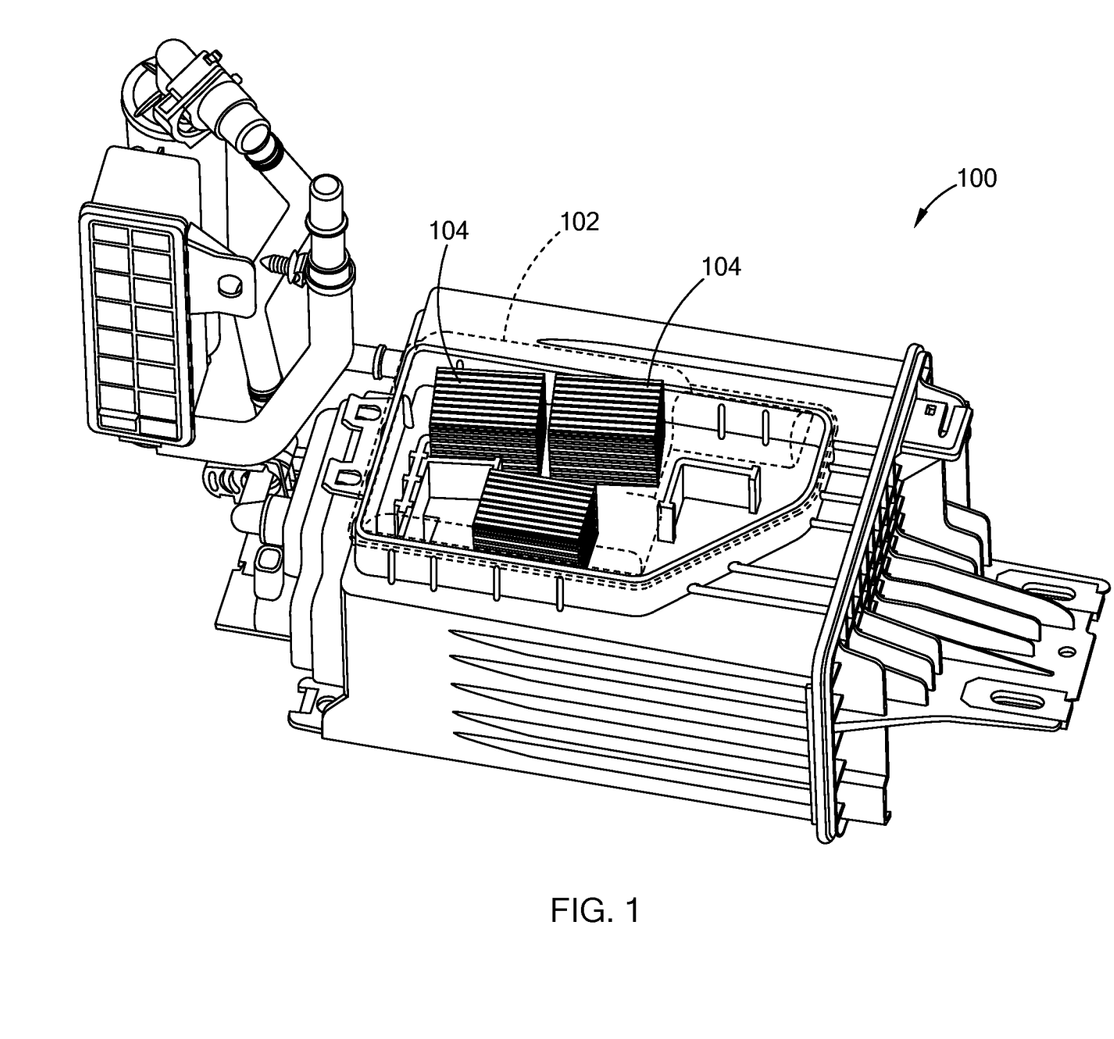
FIG. 1 illustrates a carbon canister having a carbon filter in accordance with the teachings of the present disclosure.

Referring to FIG. 1, an activated carbon canister 100 is generally included as part of an evaporative emission control system of a vehicle to capture hydrocarbon vapor emissions from a fuel tank. In addition to other components, the canister 100 includes a housing 102 and active carbon elements in the form of carbon pellets (not shown) and one or more active carbon filters 104 that are arranged within the housing 102. Hydrocarbon vapors from the fuel tank are drawn to the surface of the activate carbon elements and stored therein.

Figure 2A:
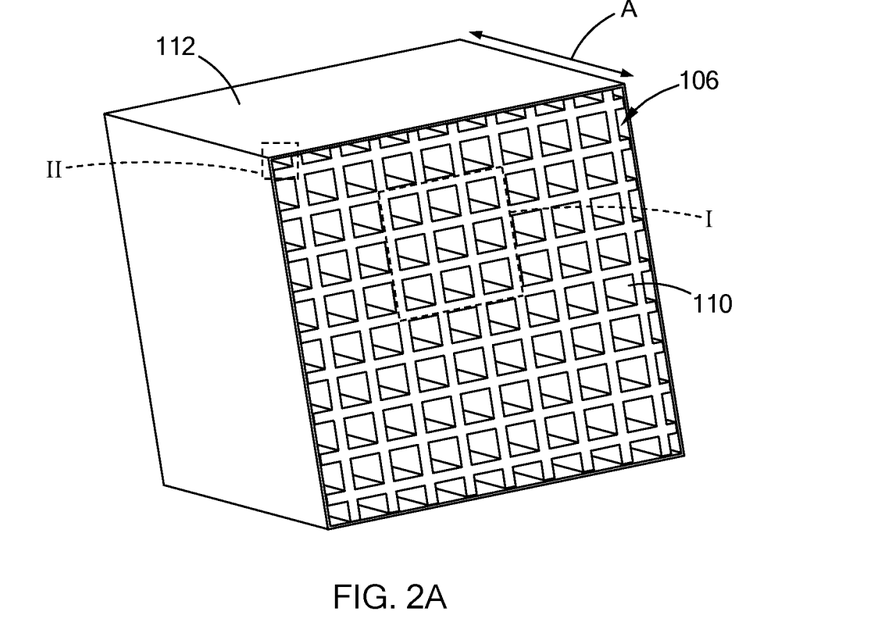
FIGS. 2A and 2B are perspective views of the carbon filter in accordance with the teachings of the present disclosure.
Figure 2B:
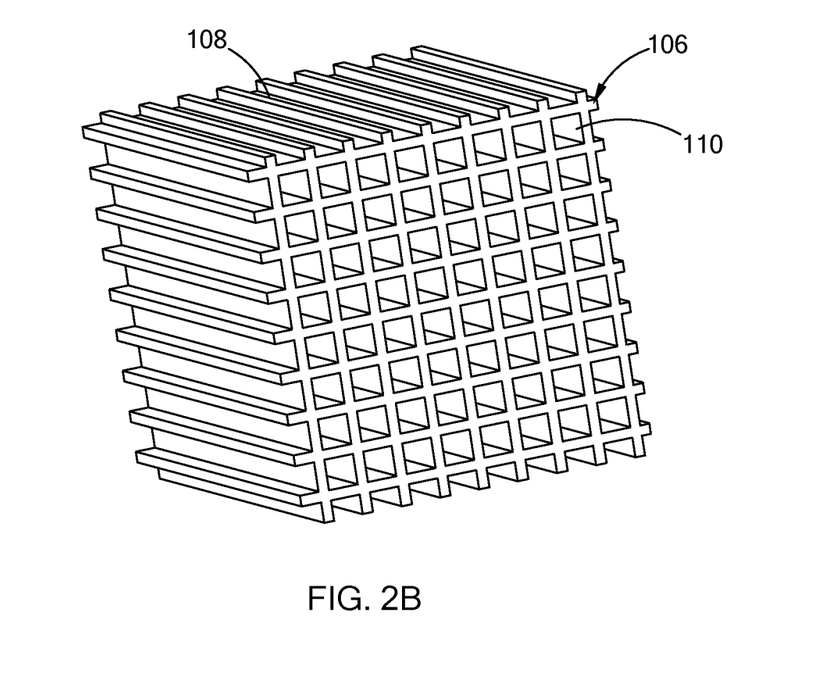
Figure 3:
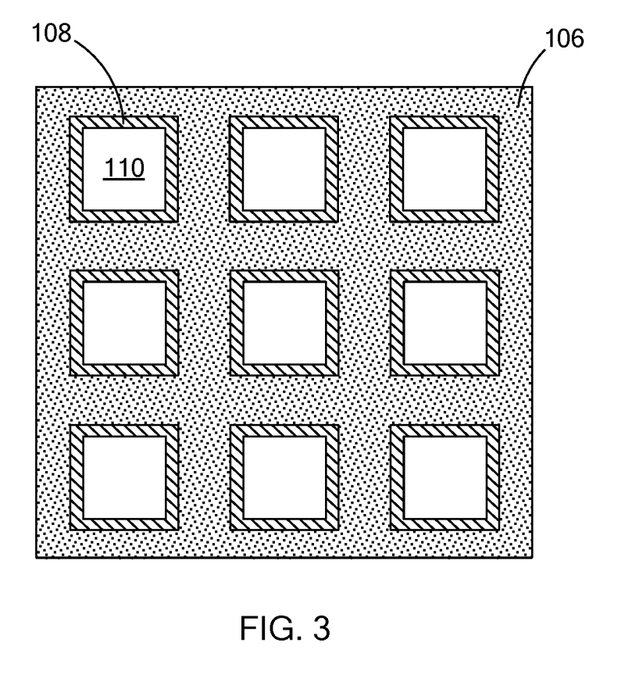
FIG. 3 is an enlarged cross-sectional view of area I of the carbon filter in FIG. 2A.
Figure 4:
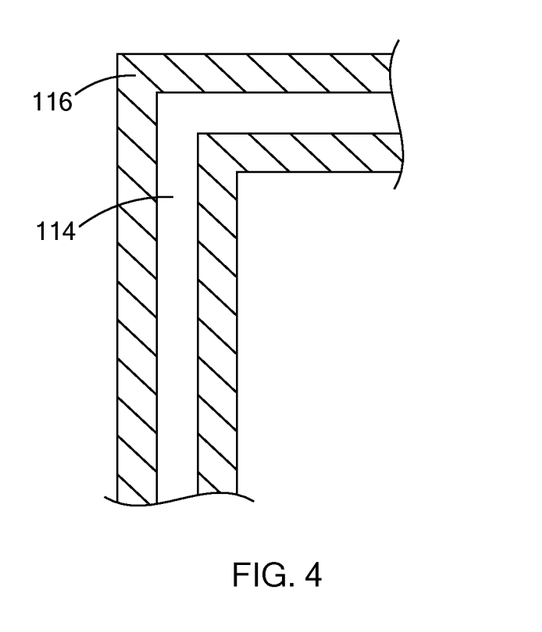
FIG. 4 is an enlarged cross-sectional view of area II of a case of the carbon filter in FIG. 2A.

Referring to FIGS. 2A, 2B, 3, and 4, considering the hydrocarbons are retained at and/or within the surface of carbon element, the carbon filter 104 of the present disclosure is configured to have a support structure with a layer of active carbon material deposited thereon, where the structure and the layer are formed of different material. In one form, the carbon filter 104 has a body 106 and an adsorption layer 108 disposed along the surface of the body 106 to form a bleed element for adsorbing hydrocarbons. In FIG. 3, the body 106 and the adsorption layer 108 are shaded differently to indicate different materials. The body 106 defines a plurality of passages 110 that extend a long a first axis (i.e., "A" in figure) and configured in a honeycomb structure. The body 106 is formed of a polymer based material, such as polypropylene (PP), polyoxymethylene (POM), polyphthalamide (PPA) and polyamide (PA). In one form, the body 106 has a cube-like shape with a square shape cross-section, and the thickness of the walls can be between 3.0 mm to 0.635 mm. But, as the support structure, the shape of the body 106 may be configured in various suitable ways, and should not be limited to the shape depicted. For example, the body 106 may be cylindrical, a column with a square or rectangular cross-section, a prism, or other suitable configuration.

The adsorption layer 108 extends throughout the body 106 including through the passages 110, and is formed of a carbon based material, such as activated carbon and carbon black. That is, the adsorption layer 108 covers each surface of the body 106 to increase adsorption surface area for the hydrocarbons. In one form, the thickness of the adsorption layer 108 is between 10 μm and 100 μm, but other suitable thicknesses are also within the scope of the present disclosure.

The carbon filter 104 may also include a case 112 for housing the body 106 having the adsorption layer 108. To further decrease hydrocarbon emissions, the case 112 is configured to have adsorption properties. That is, in one form, the case 112 has a core 114 formed of a polymer based material, similar to the body 106, and a supplemental adsorption layer 116 disposed along the surface of the core and formed of a carbon based material, similar to the adsorption layer 108 (see FIG. 4).

By separating the support structure of the carbon filter 104 from the adsorption element, various manufacturing methods may be employed to form the carbon filter 104. For example, in one form, the body 106 is formed using an injection molding process and the adsorption layer 108 is formed by coating or, in other words, depositing the carbon material on the body 106. To form the body 106, a polymer based material that is substantially in a liquid state is injected into a mold that has the honeycomb structure with the plurality of passages 110. The body 106 may then undergo one or more finishing operation to, for example, remove residual material before the adsorption layer 108 is formed.

There are a number of coating applications that can be used to form the adsorption layer, and are generally provided in a two-step process in which the carbon based material is applied in the first step and a heat treatment is performed for the second step. The heat treatment improves the bond or adhesion between the active particulates (i.e., carbon based material of the adsorption layer) and the surface of the body, through either a sintering process or in situ growth of the porous carbon based material. But the heat treatment process is not required, and other steps may be taken to improve the bond.

The first step may be accomplished through, for example, plasma enhanced chemical vapor deposition, slurry-coating, in situ growth or seeding. Plasma-enhanced chemical vapor deposition (PECVD) is an improved form of chemical vapor deposition (CVD), and can be done on the surface of the body 106. For example, in CVD, the object to be coated is heated to high temperatures before the monomer is introduced into the plasma chamber. In PECVD, on the other hand, plasma is used to accelerate the coating process. The adsorption capacity of the surface may be achieved by tailoring the surface chemical properties, and porosity. By plasma coating, highly cross-linked hydrocarbon layers can be deposited on the body 106, and these layers may have diamond-like properties by being extremely hard, smooth, and chemically resistant.

The slurry-coating may contain particles of nickel, silver, copper, or graphite, in either an acrylic or urethane resin. These coatings are available with solid contents of about 30 to 60 percent, by volume. Typically, an effective dry film thickness ranges from 1 to 5 mils (1 mil=25.4 micron).

In one form, for seeding and in situ growth, the body 106 is: impregnated with a gel or synthesis solution, followed by a flow coating or dip coating procedure, then evaporation induced self-assembly followed by a hydrothermal treatment to trigger in situ growth. These methods improve adhesion between the porous coating (i.e., the adsorption layer 108) and the body 106.

The adsorption layer may also be formed by a dip-coating process that improves control of the thickness of the adsorption layer by controlling the number of coatings. To improve adhesion between the surface of the body 106 and the coats, Aminopropyltriethoxysilane (APTS) is used together with surfactant Triton X-100.

While specific examples for forming the adsorption layer 108 is provided, other suitable methods may be used while remaining within the scope of the present disclosure.

In another form, the carbon filter 104 may be formed by a two-material injection molding process in which a composite material formed by a mixture of the polymer and carbon based materials is used as the feed material for an injection molding process. The molding process forms the body 106 having the honeycomb shape. To form the adsorption layer 108, the body 106 undergoes a sintering process to remove the polymer based material from the surface leaving the carbon based material as the adsorption layer.

Figure 6:
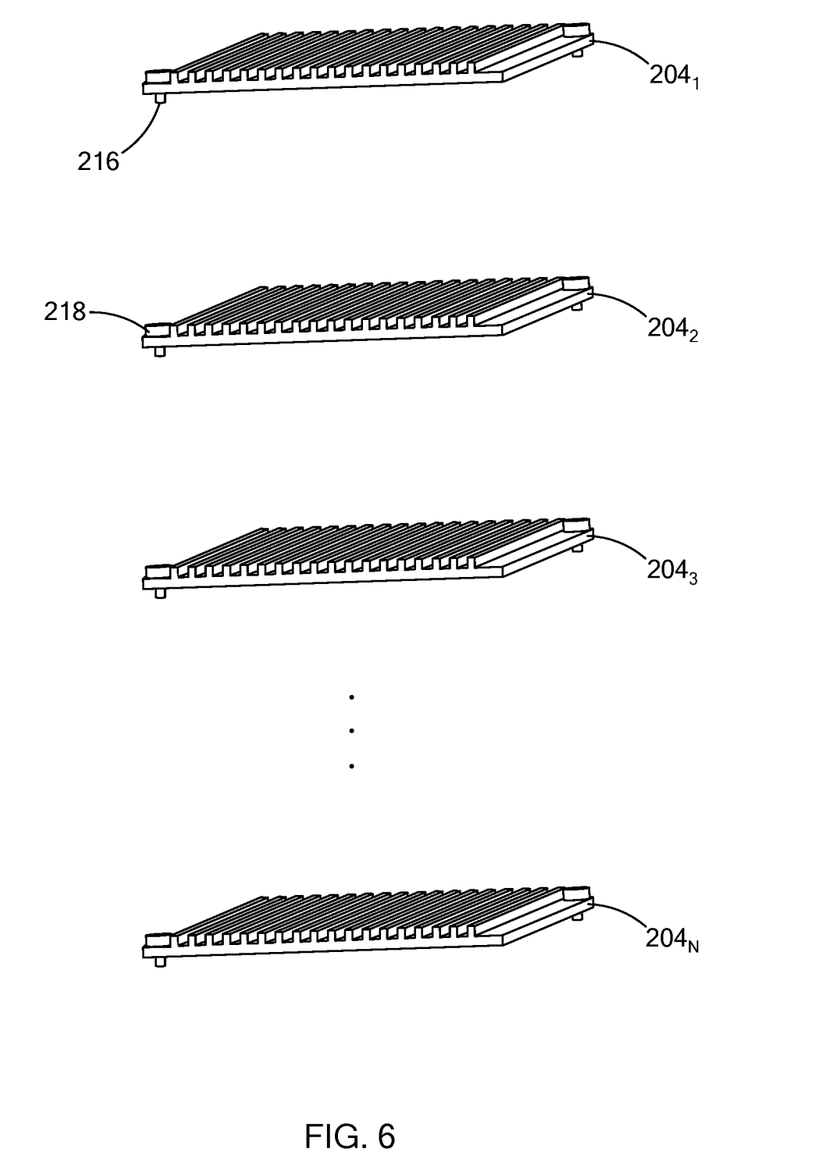
FIG. 6 is a partial exploded view of the carbon filter of FIG. 5.
Figure 7:
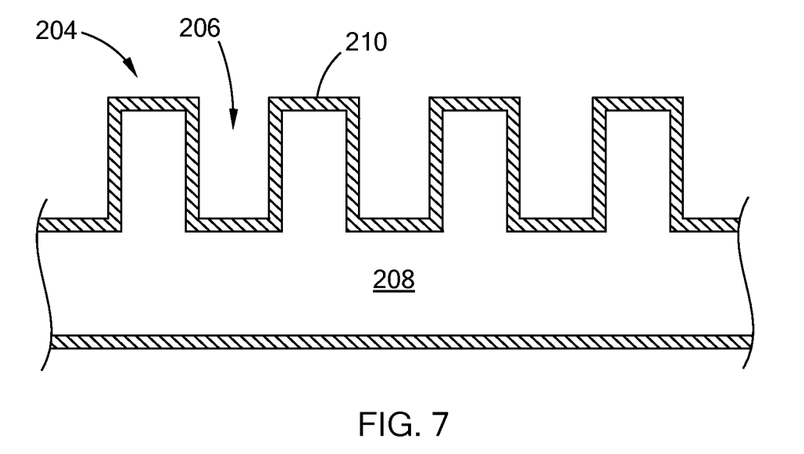
FIG. 7 is a partial cross-sectional view of a substrate 204 in accordance with the teachings of the present disclosure.

Using the methods described herein, the body 106 of the carbon filter 104 may be formed from a one piece monolithic structure having the plurality of passages 110 and honeycomb structure. In another form, the body 106 may be defined by a plurality of substrates that are arranged in a stacked configuration to form the honeycomb structure. More particularly, referring to FIGS. 5 to 7, a carbon filter 200 has a body 202 defined by a plurality of substrates 204 (e.g., substrates $204_1$, $204_2$, $204_3$, . . . , $204_N$), where each substrate 204 defines a plurality of channels 206 extending along the first axis. Each of the substrates 204 has a core portion 208 formed of a polymer based material, and an adsorption layer 210 disposed along the surface of the core portion 208 (FIG. 7).

Figure 5:
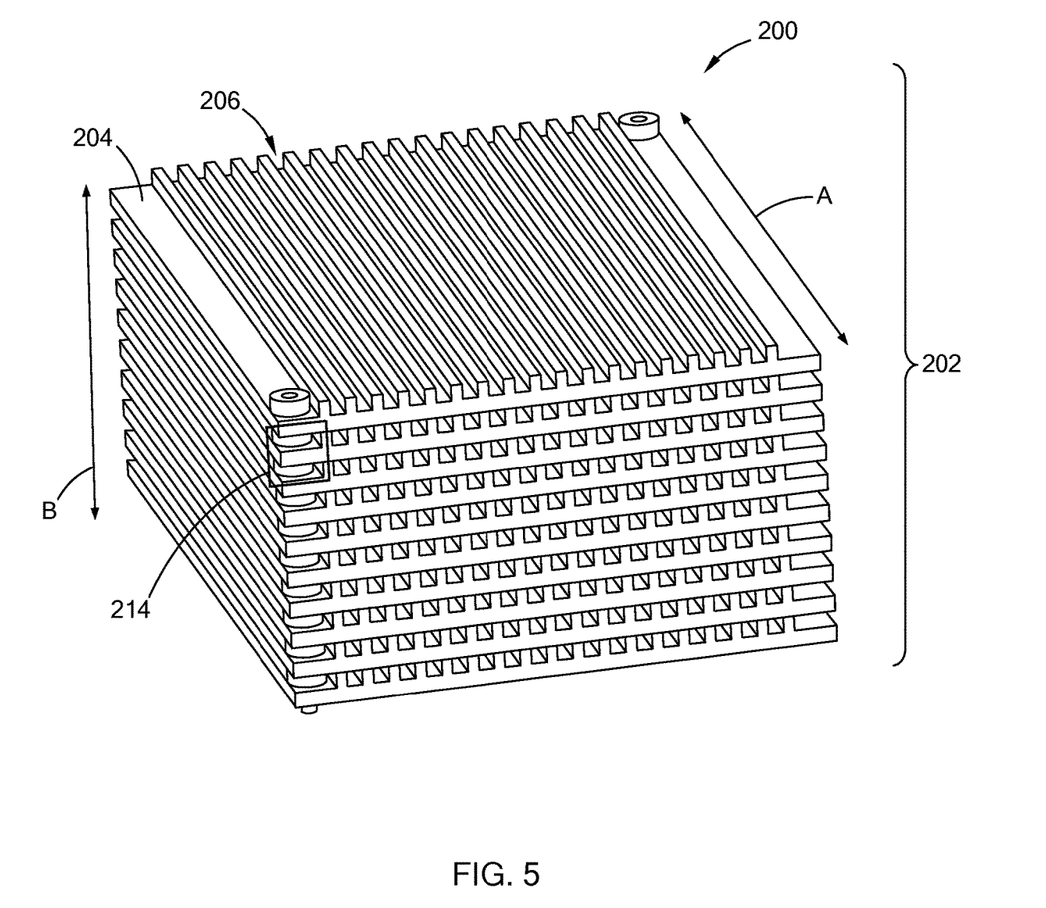
FIG. 5 is a perspective view of a carbon filter having a plurality of substrates in accordance with the teachings of the present disclosure.

By having the body 202 defined by the plurality of substrates 204, each substrate 204 may be formed using the methods described herein and then arranged in the stacked configuration. For example, in one form, the core portions 208 of the substrates 204 are formed by the injection molding process using a polymer based material, and then the carbon based material is deposited on the surface of the core to form the adsorption layer 210.

In another example, using a two-step injection molding process, the core portion 208 of each of the substrate 204 is molded using the polymer based material as the feeding material. Next, the adsorption layer 210 is molded or deposited on the top of the core portion 208 using the carbon-based material as the feeding material. Due to the heat of the two materials, the adsorption layer 210 is bonded or adheres to the core portion 208.

The plurality of substrates 204 are stacked along a second axis (i.e., axis B in figure) that is perpendicular to the first axis, and are retained in position by way of a fastening mechanism. In one form, the fastening mechanism is provided as snap fastener 214s provided between a pair of adjacent substrates 204, such as substrates $204_1$ and $204_2$. Each of the snap fasteners 214 includes an arm member 216 and an annular member 218 that receives the arm member 216. The arm member 216 is arranged on one of the substrates $204_1$ and the annular member 218 is disposed on the other substrate $204_2$, such that when stacked together, the arm member 216 is inserted and snaps in the annual member 218. Once stacked the substrates 204 define the body 106 having the adsorption, the substrates 204 may be arranged in a case.

As illustrated, the snap fasteners 214 are formed along two opposite corners of the substrates 204, but may be arranged at other positions along the substrates 204, such as along the side of the substrates 204. In addition, any number of snap fasteners 214 may be used and should not be limited to two per pair of substrates 204. Furthermore, other forms of fastening the substrates 204 to form the body 202 may also be used (e.g. adhesive), and should not be limited to the mechanical fasteners like the snap fastener illustrated.

Figure 8:
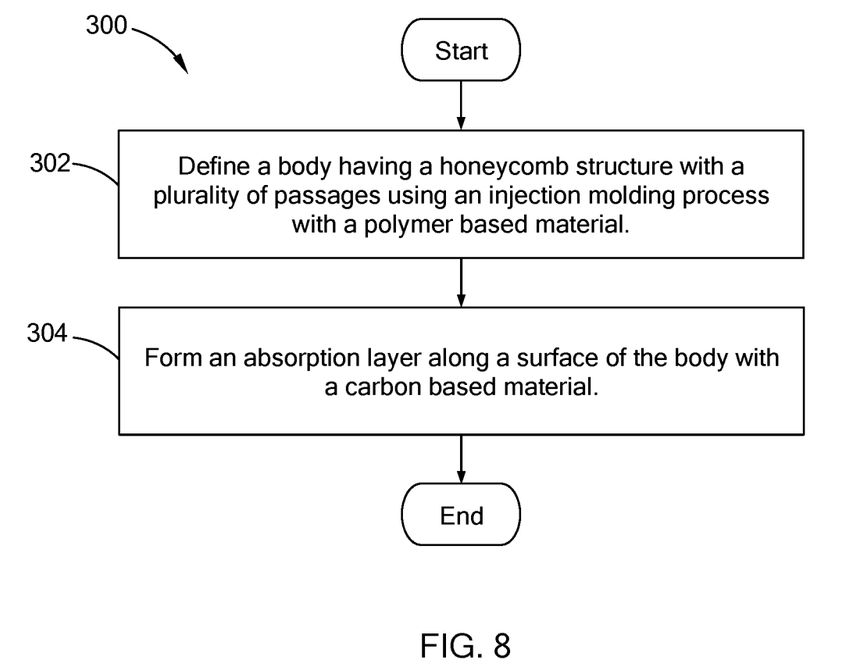
FIG. 8 is a flowchart of an example routine for forming the carbon filter in accordance with the teachings of the present disclosure.

Referring to FIG. 8, an example routine 300 for forming a carbon filter of the present disclosure is provided. At 302, a body having a honeycomb structure with a plurality of passages is defined using an injection molding process with a polymer based material. At 304, an adsorption layer is formed along a surface of the body with a carbon based material. The adsorption layer may be formed using any of the processes described above.

The carbon filter of the present disclosure is defined by two different materials, where one material is selected to form the support structure of the filter and the other is for forming the adsorption layer to capture hydrocarbons. Accordingly, the strength of the carbon filter is improved, and the cost of the filter can be controlled based on the materials selected. In addition, the method of producing the filter improves packaging space and increases flexibility in designing the shape/configuration of the filter.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing an active carbon filter for a carbon canister, the method comprising:
    defining a body having a honeycomb structure with a plurality of bleed passages from a polymer based material; and
    forming an adsorption layer along a surface of the body, wherein the adsorption layer is made of a carbon based material,
    wherein defining the body comprises:
        forming a plurality of substrates, wherein each of the substrates defines a plurality of channels extending along a first axis, and
        stacking the plurality of substrates along a second axis perpendicular to the first axis to define the body having the honeycomb structure, wherein the adsorption layer is formed along the surface of each of the substrates, and
    wherein the adsorption layer is formed on each surface of the substrates before the substrates are stacked.

2. The method of claim 1 further comprising housing the body defined by the substrates and having the adsorption layer in a case, the case having a polymer based core with a supplemental adsorption layer disposed along the surface of the core.

3. The method of claim 1, wherein the substrates are formed using injection molding.

4. The method of claim 3, wherein the forming the adsorption layer further comprises, for each of the substrates, depositing the carbon based material along the surface of the substrate, wherein the substrates are stacked after the adsorption layer is formed on the substrates.

5. The method of claim 1, wherein:
the defining the body further comprises injection molding the body using a first material made of the polymer based material and a second material made of the carbon based material, and
the forming the adsorption layer further comprises sintering the body made of the first and second materials to expose the carbon based material along the surface of the body.

6. The method of claim 1, wherein the adsorption layer is formed using one of the following procedures: dip-coating, seeding and in situ growth, or plasma coating.

7. The method of claim 1, wherein the thickness of the adsorption layer is between 10 μm to 100 μm.

8. An active carbon filter comprising:
a body defining a honeycomb structure with a plurality of bleed passages, wherein the body is defined by a polymer based material;
an adsorption layer disposed along a surface of the body, wherein the adsorption layer is defined by a carbon based material, and
a case housing the body, wherein the case has a core defined by the polymer based material and a supplemental adsorption layer defined by the carbon based material and disposed along a surface of the core.

9. The active carbon filter of claim 8, wherein:
the body is defined by a plurality of substrates, each of the substrates defines a plurality of channels extending along a first axis, and the substrates are arranged in a stacked configuration along a second axis perpendicular to the first axis to define the body having the honeycomb structure, and
the adsorption layer is disposed along the surface of each of the substrates.

10. A carbon canister comprising one or more of the active carbon filters of claim 8.

11. A method for producing an active carbon filter for a carbon canister, the method comprising:
defining a body having a honeycomb structure with a plurality of bleed passages extending along a first axis, wherein the body is formed from a polymer based material;
forming an adsorption layer along an entire surface of the body, wherein the adsorption layer is made of a carbon based material,
wherein defining the body comprises:
forming a plurality of substrates, wherein each of the substrates defines a plurality of channels extending along a first axis, and
stacking the plurality of substrates along a second axis perpendicular to the first axis to define the body having the honeycomb structure, and
wherein the adsorption layer is formed on each surface of the substrates before the substrates are stacked.

12. The method of claim 11, wherein the substrates are formed using injection molding.

13. The method of claim 11, wherein the forming the adsorption layer further comprises, for each of the substrates, depositing the carbon based material along the surface of the substrate, wherein the substrates are stacked after the adsorption layer is formed on the substrates.

* * * * *